United States Patent
Yamakawa

[11] Patent Number: 6,069,612
[45] Date of Patent: May 30, 2000

[54] CLEAR BLUE CIRCUIT FOR USE WITH COMPUTER MONITORS AND THE LIKE

[75] Inventor: Yoshifumi Yamakawa, Kanagawa, Japan

[73] Assignee: Sony Corporation, Tokyo, Japan

[21] Appl. No.: 08/975,018

[22] Filed: Nov. 20, 1997

Related U.S. Application Data

[63] Continuation of application No. 07/514,154, Apr. 25, 1990, abandoned.

[30] Foreign Application Priority Data

Apr. 28, 1989 [JP] Japan ..................................... 1-110904

[51] Int. Cl.[7] ...................................................... G09G 5/04
[52] U.S. Cl. ............................................................. 345/150
[58] Field of Search .................................. 358/21 R, 21 V, 358/27, 28, 29, 34, 29 C, 30, 33, 40, 26, 22 CK, 75; 340/701, 703, 704; 345/150

[56] References Cited

U.S. PATENT DOCUMENTS

| | | | |
|---|---|---|---|
| 4,035,835 | 7/1977 | Poetsch | 358/29 |
| 4,047,202 | 9/1977 | Poetsch | 358/29 |
| 4,183,050 | 1/1980 | Tsuchiya et al. | 358/30 |
| 4,219,840 | 8/1980 | Srivastava | 358/28 |
| 4,285,005 | 8/1981 | Srivastava | 358/28 |
| 4,410,908 | 10/1983 | Belmares-Sarabia et al. | 358/30 |
| 4,458,263 | 7/1984 | Schutte | 358/27 |
| 4,500,910 | 2/1985 | Harwood | 358/28 |
| 4,694,330 | 9/1987 | Tanaka et al. | 358/29 |
| 4,837,612 | 6/1989 | Miller | 358/27 |
| 4,884,128 | 11/1989 | Hieda | 358/27 |
| 4,922,330 | 5/1990 | Saito | 358/29 L |
| 4,930,004 | 5/1990 | Yamamoto et al. | 358/29 |

FOREIGN PATENT DOCUMENTS

| | | |
|---|---|---|
| 0 224 904 | 6/1987 | European Pat. Off. . |
| 2 483 719 | 12/1981 | France . |
| 20 07 909 | 10/1978 | Germany . |
| 2 149 267 | 6/1985 | United Kingdom . |

OTHER PUBLICATIONS

Markus, John, Modern Electronic Circuits Ret. Manual, McGraw–Hill, 1980.

*Primary Examiner*—Jeffery Brier
*Attorney, Agent, or Firm*—Hill & Simpson

[57] ABSTRACT

A control signal is produced by a first arithmetic circuit based on the difference between the blue signal component and one of the red and green components. A second analog arithmetic circuit increases the level of one of the R or the G signal component in accordance with the control signal.

13 Claims, 2 Drawing Sheets

CLEAR BLUE CIRCUIT FOR USE WITH COMPUTER MONITORS AND THE LIKE

This is a continuation of application Ser. No. 07/514,154, filed Apr. 25, 1990, now abandoned.

BACKGROUND OF THE INVENTION

1. Field of the Invention

The present invention relates generally to a display for use with a computer or the like type of device and more specifically to a so called clear blue circuit for use with such a display or monitor which improves the clarity and visibility of blue characters.

2. Description of the Prior Art

It is widely accepted that characters which are displayed in blue monochromatic color exhibit reduced visibility as compared with those displayed in green. In an attempt to overcome this problem a prior art arrangement shown in FIG. 3 has been proposed. In this arrangement the red (R), green (G) and blue (B) digital signals which have been supplied from the computer to the display interface, are subject to simple digital-analog conversion by b/A converters 101R, 101G and 101B to form analog output signals R, G and B.

In this instance each of these circuits includes a resistor dividing circuit. A logic circuit 102 determines the presence of a blue signal when a blue signal appears in the absence of red and green signals. This circuit improves the visibility of the blue characters by inducing the D/A converters 101R and 101G to output red and green signal in a predetermined ratio with respect to the blue signal. In other words, the circuit mixes a little red and green into the blue to improve clarity.

However, this circuit is incapable of processing analog RGB input. Further, the digital RGB signals can have either 8 or 16 color levels. On the other hand, analog RGB signal can have essentially an infinite number of levels or graduations. Accordingly, the above type of circuit is such that the logic circuit is incapable of distinguishing between pure blue and a blue which contains some red or green.

SUMMARY OF THE INVENTION

It is an object of the present invention to provide a so called "clear blue" circuit which improves the clarity with which blue or bluish color characters appear on the display of a computer or the like type of monitor.

In brief, the above object is achieved by an arrangement wherein a control signal is produced by first arithmetic circuit based on the difference between the blue signal component and one of the red and green components. A second analog arithmetic circuit increases the level of one of the R or the G signal component in accordance with the control signal.

In accordance with a first aspect of the present invention a circuit for a display apparatus features: a first analog signal processor for calculating the difference between a first color signal level and that of at least one of a second and third color signal; and a second analog signal processor for controlling the level of the at least one of a second and third color signal with the output of the first analog processor.

In accordance with a second aspect of the present invention a method of controlling a display apparatus features the steps of: comparing the levels of first and second color signals to determine which is the larger; determining the difference between the larger of the first and second signals and a predetermined value; subtracting the difference from the value of third color signal to determine the level of a control signal; and modifying the level the larger of the first and second color signals in accordance with the control signal.

In accordance with a third aspect of the present invention a display apparatus features: means for comparing the levels of first and second color signals to determine which is the larger; means for determining the difference between the larger of the first and second signal and a predetermined value; means for subtracting the difference from the value of third color signal to determine the level of a control signal; and means for modifying the level the larger of the first and second color signals in accordance with the control signal.

In accordance with a further aspect of the present invention a circuit for a display apparatus features: first, second and third clamp circuits, the first, second and third clamp circuits being arranged to receive first, second and third color signals respectively, the first second and third clamp circuits being responsive to a pulse signal; first and second analog arithmetic units, the first analog arithmetic unit being operatively connected with the first, second and third clamp circuits in such a manner as to receive outputs therefrom, the second analog arithmetic unit being arranged to receive the output of the second and third clamp circuits and the output of the first analog arithmetic unit, the first analog arithmetic unit including means for comparing the levels of the outputs of first and second clamp circuits to determine which is the larger; means for determining the difference between the larger of the first and second clamp circuit outputs and a predetermined value; and means for subtracting the difference from the value of the output of the third clamp circuit to determine the level of a control signal, the second analog arithmetic unit including means for modifying the level the larger of the first and second color signals in accordance with the control signal.

DETAILED DESCRIPTION OF THE PREFERRED EMBODIMENT

Figure 1:
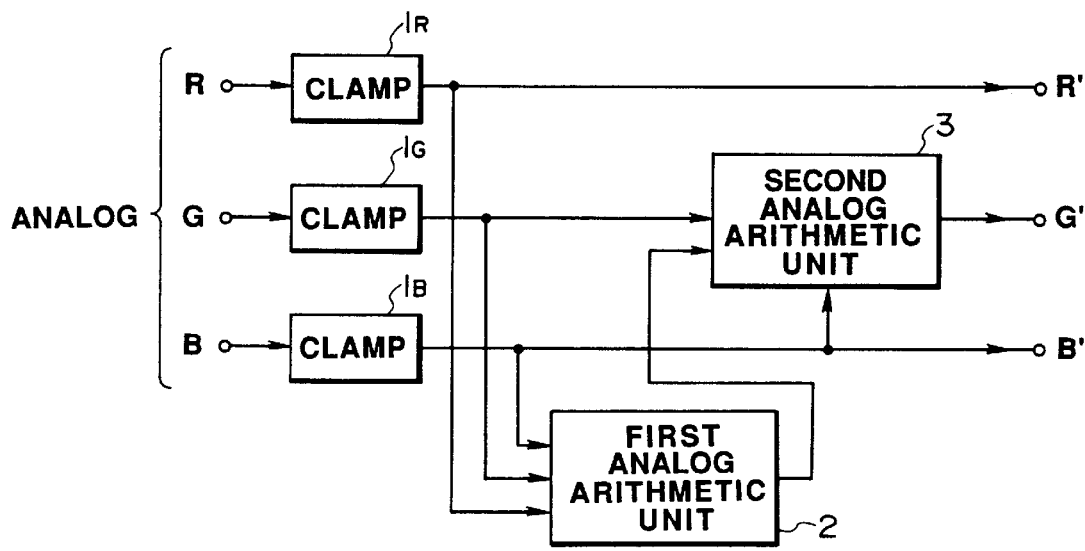
FIG. 1 is a block diagram showing the arrangement according to an embodiment of the present invention.
Figure 3:
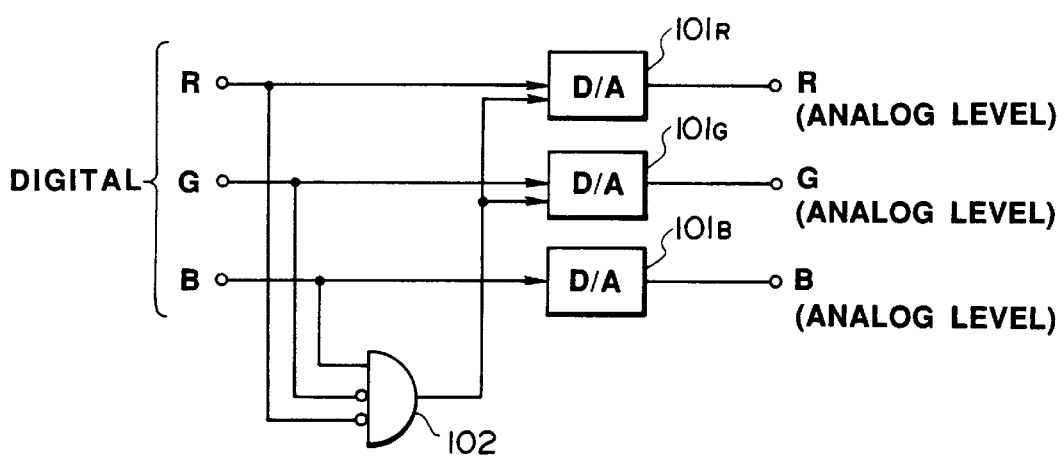
FIG. 3 is a block diagram showing the arrangement of the previously proposed clear blue circuit which was discussed in the opening paragraphs of the instant disclosure.

FIG. 1 shows in block diagram form the arrangement which characterizes an embodiment of the present invention. In this embodiment the ratio of green in a blue character display in increased. Clamping circuits 1R, 1G and 1B clamp each of the respective R, G and B signals of an analog RGB signal at a 0 level via feedback operation. A first analog arithmetic unit 2 receives each of the R, G and B from the clamping circuits and produces a control voltage which increases in accordance with the difference between the largest of the three signals and a predetermined level.

A second analog arithmetic unit 3 is arranged to receive inputs from the blue and green signal clamping circuits 1B and 1G along with the control voltage from the first analog arithmetic unit 2.

R', G' and B' signals appear on the output terminals of the circuit.

In the first analog arithmetic unit 2 the control voltage "a" is developed in accordance with the following equation:

$$a=\{B-((GR)-C)\} \quad (1)$$

wherein (GR) indicates the greater signal component between the G and R signals, B denotes the blue signal component, and C denotes a predetermined value in the form of a fixed number. In accordance with this, when B is larger than the sum of C and the larger of G and R, the control voltage "a" which increases as same as a difference of (GR)–C, is obtained.

In the second analog arithmetic unit 3 a calculation in accordance with the following equation is executed.

$$G'=(1-ak1)G+ak1B \quad (2)$$

where $0 \leq ak1 < 1$; and k1 is a predetermined constant.

In accordance with this calculation, the original value of G is modified by the control voltage "a" which varies with the relative difference between the R and B signal levels. In this instance the higher the original G signal component is the lower the control voltage becomes. In this instance it is considered that an upper interface level be set a level of 0.7 Volt (for example).

In the case red is mixed into the blue the following relationship is utilized:

$$R'=(1-ak2)R+ak2B \quad (3)$$

where $0 \leq ak2 < 1$; and k2 is a predetermined constant.

Operation

The operation of the above described circuit is such that the first analog arithmetic unit 2 produces a control signal of the nature which varies in accordance with the degree by which the B signal component is greater than the R or G signals. The second analog arithmetic unit 3 responds to the signal "a" and increases the amount of green which is produced and which mixes into the B signal by dynamically varying the ratio defined between the two. This enables a clear blue function to be realized.

Of course it is within the scope of the present invention to use the red signal in place of the green and/or use both if so desired and/or deemed appropriate.

However, in actual practice, the B signal component is not mixed with the R component under the conditions k2=0 in equation (3) and if only the G signal is mixed with the blue signal the blue or bluish color characters become more clear and apparent. The reason for this is deemed to be the fact that the human eye perceives green to be more visible than other colors.

As mentioned above, the present invention is not limited to mixing in only one color. When green is mixed into the blue, the blue color tends to shift toward cyan while when red is mixed in the resulting color tends to shift in the magenta direction. These colors tend to be brighter and provide improved visibility.

Figure 2:
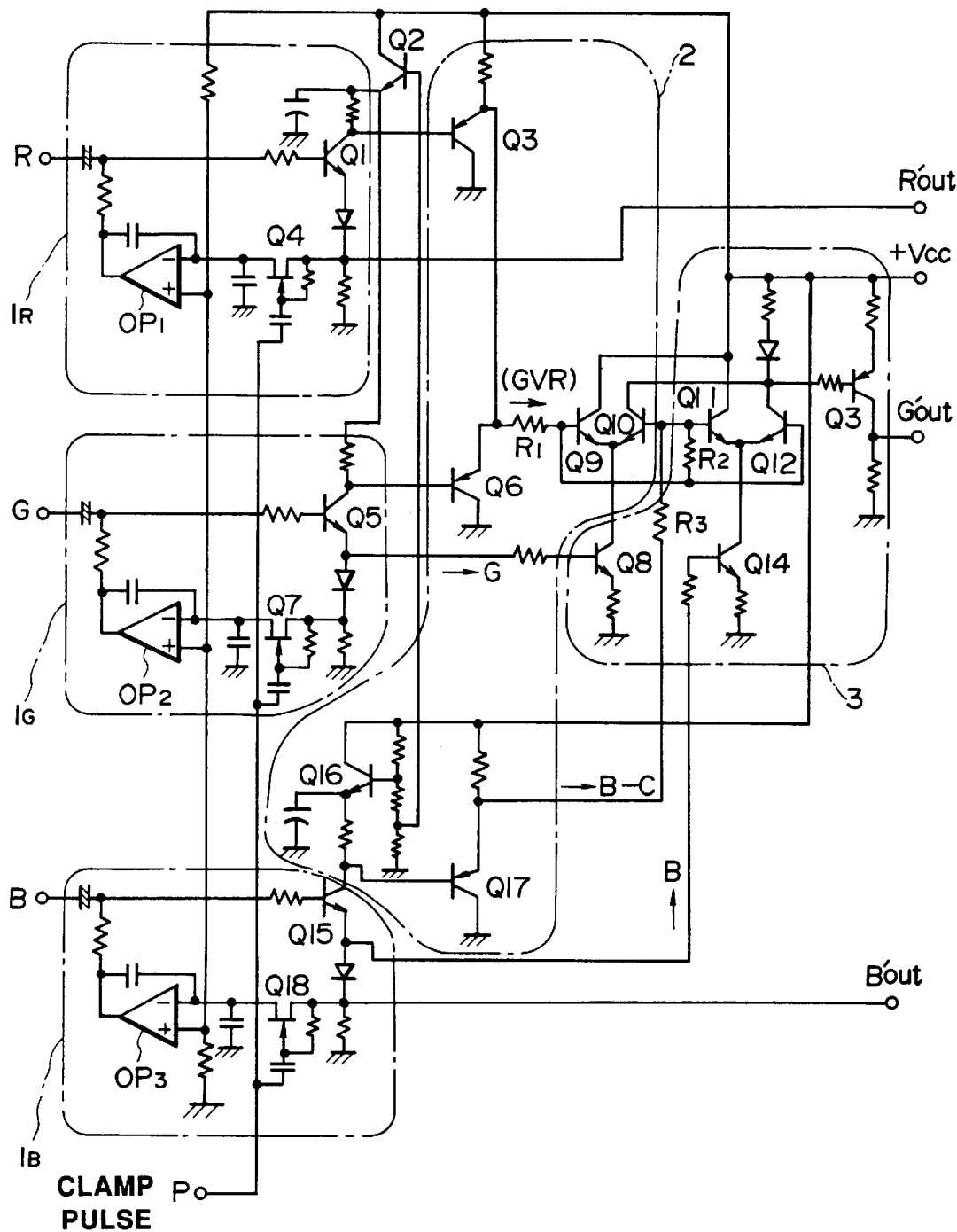
FIG. 2 is a circuit diagram showing an actual example of the circuit which can used in the arrangement shown in FIG. 1.

FIG. 2 shows an actual circuit arrangement which can be used in accordance with the first embodiment.

In this circuit clamping circuit IR is comprised of a transistor Q1, a MOS transistor Q4 and an operational amplifier OP1. Similarly, the clamping circuit 1G is comprised of transistor Q5, a MOS transistor Q7 and an operational amplifier OP2. Clamping circuit 1B includes transistor Q15, a MOS transistor Q18 and an operational amplifier OP3.

These clamping circuits 1R, 1G and 1B are responsive to a clamp pulse P in a manner wherein transistors Q4, Q7 and Q18 are rendered conductive (ON) and maintain the feedback clamp on. In the instant circuit arrangement the first and second analog arithmetic units 2 and 3 are difficult to distinguish from one another. However, the first unit may be deemed to include transistors Q3, Q6, Q9, Q10, Q16 and Q17. In this circuit, transistors Q3 and Q6 perform the (Gr R) calculation. The differential calculation is performed by transistors Q9 and Q10 and receive the arithmetic results "a" in accordance with equation (1) to produce a control voltage ak1. In this instance, the constant k1 is determined by the values of resistors R1, R2 and R3.

The second arithmetic unit 3 can be deemed to consist essentially of transistors Q8, Q11, Q12, Q13 and Q14. The circuit including transistors Q9 and Q10 perform the gain control of the G signal component (viz., the (1–ak1)G portion of equation (2) via transistor Q8.

The circuit including transistors Q11 and Q12 perform the gain control for the B signal component or the ak1B operation in accordance with equation (2). Transistor Q3 add the current flowing through the collectors of the commonly connected transistors Q10 and Q12 to derive the G' signal in accordance with said equation (2).

As will be readily apparent the desired effect can be obtained even if the ratio of R and G signal components to the B signal one is nearly constant. Accordingly, the present invention is not limited to the above described circuit arrangement and various modifications and/or changes can be made in the manner in which the RGB signal are treated.

What is claimed is:

1. A method of controlling a display apparatus which displays three primary colors, comprising the steps of:

comparing the levels of first and second primary color signals to determine which is the larger;

determining the difference between the larger, of the first and second primary color signal and a predetermined value;

subtracting the difference from the value of third primary color signal to determine the level of a control signal; and modifying the level the larger of the first and second primary color signals in accordance with the control signal, whereby the clarity of display of said first primary color is increased.

2. In a display apparatus which displays three primary colors, the combination comprising:

means for comparing the levels of first and second primary color signals to determine which is the larger;

means for determining the difference between the larger of the first and second primary color signal and a predetermined value;

means for subtracting the difference from the value of third primary color signal to determine the level of a control signal; and means for modifying the level the larger of the first and second primary color signals in accordance with the control signal, where the clarity of display of said first primary color is increased.

3. In a circuit for a display apparatus which display three primary colors, the combination comprising:

first, second and third clamp circuits, said first, second and third clamp circuits being arranged to receive first, second and third primary color signals respectively, said first, second and third clamp circuits being responsive to a pulse signal;

first and second analog arithmetic units, said first analog arithmetic unit being operatively connected with said first, second and third clamp circuits in such a manner as to receive outputs therefrom, said second analog arithmetic unit being arranged to receive the output of said second and third clamp circuits and the output of said first analog arithmetic unit, said first analog arithmetic unit including:

means for comparing the levels of the outputs of first and second clamp circuits to determine which is the larger;

means for determining the difference between the larger of the first and second clamp circuit outputs and a predetermined value; and means for subtracting the difference from the value of the output of the third clamp circuit to determine the level of a control signal, said second analog arithmetic unit including:

means for modifying the level the larger of the first and second color signals in accordance with the control signal, whereby the clarity of display of said first primary color is increased.

4. A method of controlling a display apparatus comprising the steps of:

comparing levels of first and second primary color signals to determine which is larger;

determining a difference between the larger of the first and second primary color signals and a third primary color signal;

subtracting a predetermined value from the difference to determine a level of a control signal; and modifying the level of at least one of the first and second primary color signals in accordance with the control signal.

5. The method according to claim 4, wherein the third primary color signal is blue.

6. A method of controlling a display apparatus comprising the steps of:

determining that a difference between one of a first and a second primary color signal and a third primary color signal exceeds a predetermined value;

generating a control signal in response to the difference if the difference exceeds a predetermined value; and modifying the level of at least one of the first and second primary color signals based on the control signal.

7. The method according to claim 6, wherein the third primary color signal is blue.

8. In a display apparatus which displays three primary colors, the combination comprising:

means for comparing levels of first and second primary color signals to determine which is larger;

means for determining a difference between the larger of the first and second primary color signal and a third primary color signal;

means for subtracting a predetermined value from the difference to determine a level of a control signal; and means for modifying a level of at least one of the first and second primary color signals based on the control signal.

9. The apparatus according to claim 8 wherein the third primary color signal is blue.

10. A display apparatus which displays at least three primary colors comprising:

means for determining that a difference between one of a first and a second primary color signal and a third primary color signal exceeds a predetermined value;

means for generating a control signal in response to the difference if the difference exceeds a predetermined value; and means for modifying the level of at least one of the first and second primary color signals based on the control signal.

11. The apparatus according to claim 10 wherein the third primary color signal is blue.

12. A display apparatus which displays at least three primary colors comprising:

first, second and third clamp circuits, said first, second and third clamp circuits being arranged to receive first, second and third primary color signals respectively, said first, second and third clamp circuits being responsive to a pulse signal;

first and second analog arithmetic units, said first analog arithmetic unit being in electrical communication with said first, second and third clamp circuits in such manner as to receive output therefrom, said second analog arithmetic unit being arranged to receive an output of said second and third clamp circuits and the output of said first analog arithmetic unit, said first analog arithmetic unit including:

means for comparing levels of outputs from the first and second clamp circuits to determine which is the larger;

means for determining a difference between the larger of the first and second clamp circuit outputs and the third clamp circuit output; and means for subtracting a predetermined value from the difference to determine the level of a control signal;

said second analog arithmetic unit including:

means for modifying a level of at least one of the first and second primary color signals based on the control signal.

13. The circuit according to claim 12 wherein the third primary color signal is blue.

* * * * *